United States Patent [19]
Higton et al.

[11] 4,365,184
[45] Dec. 21, 1982

[54] PHOSPHORS

[75] Inventors: Malcolm Higton; Aron Vecht, both of London, England

[73] Assignee: The Secretary of State for Defence in Her Britannic Majesty's Government of the United Kingdom of Great Britain and Northern Ireland, England

[21] Appl. No.: 128,552

[22] Filed: Mar. 10, 1980

Related U.S. Application Data

[63] Continuation of Ser. No. 928,696, Jul. 27, 1978, abandoned, which is a continuation of Ser. No. 801,211, May 27, 1977, abandoned.

[30] Foreign Application Priority Data

Jun. 1, 1976 [GB] United Kingdom ............... 22597/76

[51] Int. Cl.³ ...................... H05B 33/10; H05B 33/14
[52] U.S. Cl. .................................... 313/503; 29/25.11; 29/25.13; 252/301.4 S; 252/301.6 S; 313/506; 313/509; 427/12; 427/64; 427/66; 427/157
[58] Field of Search .................. 252/301.4 S, 301.6 S; 427/64, 66, 12, 157; 29/25.11, 25.13; 313/503, 506, 509

[56] References Cited

U.S. PATENT DOCUMENTS

| 3,731,353 | 5/1973 | Vecht | 427/66 |
| 3,984,586 | 10/1976 | Kawarada et al. | 427/64 |
| 4,140,937 | 2/1979 | Vecht et al. | 313/503 |

FOREIGN PATENT DOCUMENTS

| 1300548 | 12/1972 | United Kingdom . |
| 1314522 | 4/1973 | United Kingdom . |
| 1353143 | 5/1974 | United Kingdom . |
| 1449602 | 9/1976 | United Kingdom . |

OTHER PUBLICATIONS

Kanari, P. S., "Photoluminescence in Copper and Manganese Activated Strontium Sulphide Phosphors".

Lehman, "Activators and Co-Activators in Calcium Sulphide Phosphors," Journal of Luminescence, 5, 87–107, 1972.

Masoorkar et al., "Voltage & Frequency Dependence of Brightness in SRS: Cu Electroluminophors," Indian J. of Pure and Applied Physics, 11, Sep. 1973, pp. 688–690.

*Primary Examiner*—John D. Smith
*Attorney, Agent, or Firm*—Stevens, Davis, Miller & Mosher

[57] ABSTRACT

This invention provides phosphors for use in electroluminescent devices. Each phosphor contains a dopant and at least one of the sulphides of the group consisting of strontium, calcium, barium and magnesium sulphide.

13 Claims, 1 Drawing Figure

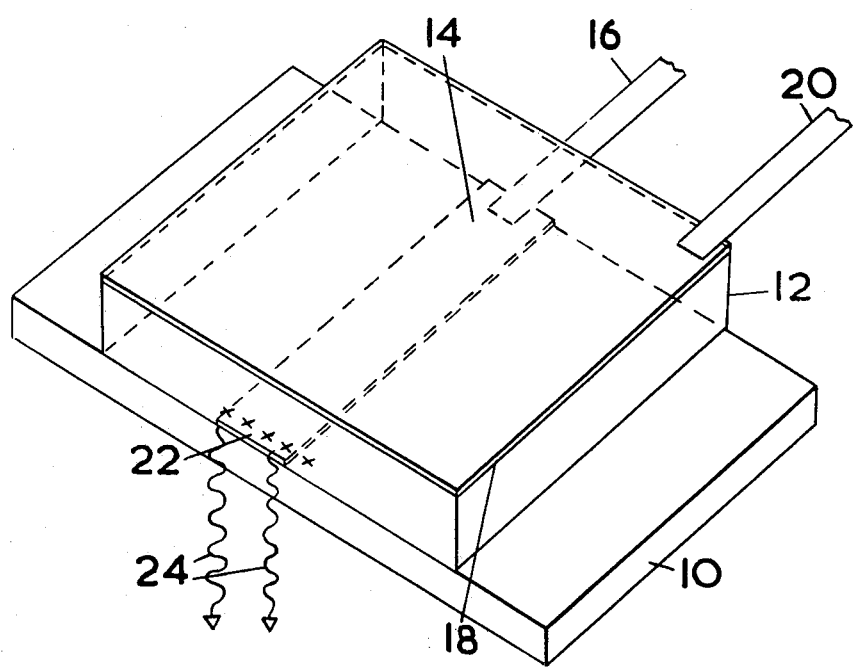

PHOSPHORS

This is a continuation of application Ser. No. 928,696 filed July 27, 1979, now abandoned which in turn is a continuation of application Ser. No. 801,211, now abandoned filed May 27, 1977.

This invention relates to phosphors and particularly to phosphors for use in electroluminescent devices.

According to this invention there is provided a phosphor for use in an electroluminescent device the phosphor including a dopant as hereinafter defined, and at least one of the sulphides of a first group consisting of strontium, calcium, barium and magnesium sulphide.

The phosphor may include a solid solution of two or more of the sulphides of said first group or a solid solution of at least one of the sulphides with one of the members of a second group consisting of the selenides and tellurides of strontium, calcium, barium and magnesium and the sulphides, selenides and tellurides of mercury, cadmium, zinc, barium-zinc and barium-cadmium.

The phosphor may include a mixture of sulphides or solid solutions of the sulphides from the first group or a mixture of one or more of the sulphides or solid solutions of the sulphides with one or more members or solid solutions of the members of the second group.

In this specification a dopant is an element or combination of elements which functions as an activator to cause the phosphor to be electroluminescent or functions as a co-activator to enhance the electroluminescence or otherwise assists the electroluminescent properties of the phosphor.

The dopant is at least one of the members of a third group consisting of manganese, copper, chlorine, bromine, iodine, fluorine, aluminium, arsenic, lead, thorium, gallium, silver, antimony, tin, uranium, bismuth, gold, thallium, indium, scandium, vanadium, chromium, iron, cobalt, nickel, molybdenum, zirconium, yttrium, the alkali metals and the rare earth elements excluding promethium.

This invention extends to an electroluminescent device incorporating a phosphor having a composition as aforesaid. The device may include a matrix; phosphor particles coated with an element of group Ib of the Periodic Table embedded in the matrix and a pair of electrodes in contact with the particle bearing matrix. Coated in this specification means that the coating substance, that is the element of group Ib, has been caused to react with the outer layers of phosphor molecules so that some of the atoms of the metallic element therein are replaced by atoms of the coating substance, which is preferably copper.

The electroluminescent device may be formed for use with DC. A formed electroluminescent device means in this specification a device which has had passed through its phosphor layer a DC current until the electrical resistance of the phosphor layer has increased irreversibly.

The invention will now be described by way of example only with reference to the following examples and the accompanying drawing.

EXAMPLE 1

Strontium sulphide was prepared as a fine white powder as described in our UK Pat. No. 1449602. The powder was then intimately mixed with 1.5 molar % of manganese sulphide and the resulting mixture was slurried with 0.1 molar % of copper acetate in methanol. The slurry was then thoroughly dried in a vacuum and then fired in a capped silica boat in a stream of $N_2$ at 900° C. for 1 hour. The phosphor particles were then coated with copper as described in either our UK Pat. Nos. 1353143 or 1314522. The coated particles were then dried before being incorporated in an electroluminescent device. A typical device is shown in the accompanying drawing where 10 is an insulating substrate of glass which has deposited upon it a thin strip of tin oxide 14 which forms a first electrode. There is provided upon the electrode 14 a phosphor layer 12 which comprises a matrix of polymethylmethacrylate containing a dispersion of phosphor particles. A second electrode is formed by an aluminium film 18 evaporated onto the upper face of the phosphor layer 12. Connections to the first and second electrodes are made by lengths of metal foil 16 and 20 respectively. The device was then formed as described in our UK Pat. No. 13500548. After forming the device can be excited by AC or DC current to emit light (as indicated by the wavy lines 24) from the region 22 of the phosphor layer. The region 22 is predetermined by the configuration of the first and second electrodes however the region may be determined by anyone of the methods set forth in our aforesaid UK Pat. No. 1300548. A device incorporating phosphor particles made as described in this example was found to emit light in the green region of the spectrum and to exhibit a luminescence of 40 foot lamberts when excited by a DC current of 3 mA and 100 volts.

EXAMPLE 2

Calcium sulphide was prepared as a fine white powder by decomposition of the hydrosulphide as described in our UK Pat. No. 1449602. The powder was then intimately mixed with 1.0 molar % of cerium sulphide and 2.0 molar % of either calcium chloride or ammonium chloride. The intimate mixture was fired in a capped silica boat in a stream of $N_2$ at 1200° C. for 2 hours. The particles were coated and incorporated into a device as previously described for example 1. The resultant device emitted in the green region of the spectrum and exhibited a luminescence of 40 foot lamberts when excited with a DC current of 6 mA at 100 volts.

EXAMPLE 3

As for example 2 but cerium chloride (3.0 molar %) was substituted for cerium sulphide and calcium or ammonium chloride.

EXAMPLE 4

As for example 2 but europium sulphide (1.0 molar %) was substituted for cerium sulphide.

EXAMPLE 5

As for example 2 but europium chloride (1.0 molar %) was substituted for cerium sulphide and calcium or ammonium chloride.

Devices prepared as described with reference to example 1 but using phosphors made according to examples 4 and 5 emitted light in the red region of the spectrum and exhibited a luminescence of 10 foot lamberts when excited with a DC current of 5 mA at 100 volts.

EXAMPLE 6

Strontium sulphide was prepared as a fine white powder as described in our UK Pat. No. 1449602 and was intimately mixed with 0.5 molar % of copper sulphide and 0.5 molar % of sodium nitrate. The intimate mixture was then fired in a capped silica boat in a stream of $N_2$ at 900° C. for 1 hour. The particles were coated and incorporated into a device as described for example 1. The resultant device exhibited a luminescence of 20 foot lamberts in the green region of the spectrum when excited by a DC current of 5 mA at 110 volts.

EXAMPLE 7

Strontium sulphide was prepared as a fine white powder as described in our UK Pat. No. 1449602 and was intimately mixed with 5.0 molar % of thulium chloride and 0.2 molar % of copper acetate. The intimate mixture was then fired in a capped silica boat in a stream of $N_2$ at 900° C. for 3 hours. The particles were coated and incorporated in a device as described for example 1. The resultant device exhibited a luminescence of 5 foot lamberts in the blue/green region of the spectrum when excited with a DC current of 5 mA at 100 volts.

It will be appreciated by those skilled in the art that the phosphors may be prepared by replacing the dopants given in the examples by other salts of the same metal and that successful results may be achieved with considerable variations of the molar % given in the examples. It will also be appreciated that alternative methods to those described in our UK Pat. Nos. 1314522, 1353143 and 1449602 may be employed.

The colour of the light emitted by the phosphor may be altered by forming mixtures and solid solutions of the hosts so as to alter the host lattice. By way of example the host zinc sulphide activated with copper and manganese emits in the yellow region of the spectrum and the host strontium sulphide activated by same elements emits in the green region, by combining these hosts in a mixture of solid solutions and mixtures a range of phosphors capable of emitting from the yellow region through to the green region can be made.

What is claimed is:

1. A process for making a DC electroluminescent device including the steps of
   a. producing phosphor particles including a sulphide selected from the group consisting of strontium, calcium, barium and magnesium sulphide mixed with a dopant comprising cerium,
   b. coating said phosphor particles with an element of group Ib of the Periodic Table to introduce said element into the extended surface of said particles,
   c. embedding the coated particles in a matrix,
   d. arranging the resulting particle bearing matrix as a phosphor layer in contact with two electrodes, and
   e. passing a forming direct electrical current between the two electrodes until the electrical resistance is increased in a localized and predetermined region of the phosphor layer.

2. A process for making a DC electroluminescent device including the steps of
   a. producing phosphor particles comprising (1) stronium sulfide mixed with a dopant containing cerium, (2) strontium sulfide mixed with a dopant containing copper, (3) strontium sulfide mixed with a dopant containing copper and sodium or (4) calcium sulfide mixed with a dopant containing cerium,
   b. coating said phosphor particles with an element of group Ib of the Periodic Table to introduce said element into the extended surface of said particles,
   c. embedding the coated particles in a matrix,
   d. arranging the resulting particle bearing matrix as a phosphor layer in contact with two electrodes, and
   e. passing a forming direct electrical current between the two electrodes until the electrical resistance is increased in a localized and predetermined region of the phosphor layer.

3. The process of claim 2 wherein the phosphor particles, contain strontium sulfide and a dopant containing copper and sodium.

4. The process of claim 2 wherein the phosphor particles comprise strontium sulfide mixed with a dopant comprising cerium.

5. The process of claim 2 wherein the phosphor particles comprise strontium sulfide mixed with a dopant containing copper.

6. The process of claim 2 wherein the phosphor particles comprise calcium sulfide mixed with a dopant containing cerium.

7. The product of the process of claim 4, 5 or 6.

8. A DC electroluminescent device comprising an electrical insulating base, a first electrode supported on the base, a plastic matrix having phosphor particles embedded therein disposed as a layer with one side on said base and over said first electrode and an opposite side, a second electrode disposed in electrical contact with said opposite side of the said layer, and means for connecting said electrodes to a souce of DC electric current to excite the phosphor layer to emit light, said phosphor particles comprising a member selected from the group consisting of strontium sulphide, calcium sulphide, barium sulphide, and magnesium sulphide mixed with a dopant comprising cerium which activates the phosphor to be electroluminescent, said phosphor particles being coated with an element of Group Ib of the Periodic Table.

9. A DC electroluminescent device comprising an electrical insulating base, a first electrode supported on the base, a plastic matrix having phosphor particles embedded therein disposed as a layer with one side on said base and over said first electrode and an opposite side, a second electrode disposed in electrical contact with said opposite side of the said layer, and means for connecting said electrodes to a source of DC electric current to excite the phosphor layer to emit light, said phosphor particles comprising (1) strontium sulfide mixed with a dopant containing cerium, (2) strontium sulfide mixed with a dopant containing copper, (3) strontium sulfide mixed with a dopant containing copper and sodium, or (4) calcium sulfide mixed with a dopant containing cerium which dopant activates the phosphor to be electroluminescent, said phosphor particles being coated with an element of Group Ib of the Periodic Table.

10. The electroluminescent device of claim 9 wherein the phosphor particles contain strontium sulphide and a dopant comprising both copper and sodium.

11. The electroluminescent device of claim 9 wherein the phosphor particles comprise strontium sulfide mixed with a dopant containing cerium.

12. The electroluminescent device of claim 9 wherein the phosphor particles comprise strontium sulfide mixed with a dopant containing copper.

13. The electroluminescent device of claim 9 wherein the phosphor particles comprise calcium sulfide mixed with a dopant containing cerium.

* * * * *

UNITED STATES PATENT AND TRADEMARK OFFICE
CERTIFICATE OF CORRECTION

PATENT NO. : 4,365,184
DATED : December 21, 1982
INVENTOR(S) : HIGTON et al

It is certified that error appears in the above—identified patent and that said Letters Patent is hereby corrected as shown below:

On the title page, Column 1, Item (30)

change "22597/76 to -- 22697/76 --.

Signed and Sealed this

Seventh Day of June 1983

[SEAL]

Attest:

DONALD J. QUIGG

Attesting Officer

Acting Commissioner of Patents and Trademarks